United States Patent
Johnson et al.

(10) Patent No.: US 7,774,301 B2
(45) Date of Patent: Aug. 10, 2010

(54) USE OF FEDERATION SERVICES AND TRANSFORMATION SERVICES TO PERFORM EXTRACT, TRANSFORM, AND LOAD (ETL) OF UNSTRUCTURED INFORMATION AND ASSOCIATED METADATA

(75) Inventors: Sean Allen Johnson, Chapel Hill, NC (US); Amisha Parikh, San Jose, CA (US); Angela Fagundes Reese, Austin, TX (US); Ravishankar Sathyam, Naperville, IL (US); Clifford J. Vars, IV, Austin, TX (US); Jedd Samuel Weise, San Luis Obispo, CA (US); Anderson Edward Wolfe, Morehead City, NC (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/614,923

(22) Filed: Dec. 21, 2006

(65) Prior Publication Data
US 2008/0154927 A1 Jun. 26, 2008

(51) Int. Cl.
*G06F 17/30* (2006.01)
(52) U.S. Cl. .................. 707/602; 707/811; 707/803
(58) Field of Classification Search ............... None
See application file for complete search history.

(56) References Cited

U.S. PATENT DOCUMENTS

| | | | |
|---|---|---|---|
| 6,606,632 B1 | 8/2003 | Saulpaugh et al. | |
| 6,609,130 B1 | 8/2003 | Saulpaugh et al. | |
| 6,643,663 B1 | 11/2003 | Dabney et al. | |
| 6,804,674 B2 | 10/2004 | Hsaio et al. | |
| 6,904,428 B2 | 6/2005 | Frieder et al. | |
| 6,910,040 B2 | 6/2005 | Emmick et al. | |
| 6,961,760 B2 | 11/2005 | Li et al. | |
| 7,016,963 B1 | 3/2006 | Judd et al. | |
| 7,051,334 B1 | 5/2006 | Porter et al. | |
| 2002/0026443 A1* | 2/2002 | Chang et al. | 707/10 |
| 2004/0015783 A1* | 1/2004 | Lennon et al. | 715/523 |
| 2004/0205452 A1* | 10/2004 | Fitzsimons et al. | 715/500 |
| 2005/0050069 A1* | 3/2005 | Vaschillo et al. | 707/100 |
| 2005/0138081 A1* | 6/2005 | Alshab et al. | 707/200 |
| 2005/0203931 A1* | 9/2005 | Pingree et al. | 707/100 |
| 2007/0011175 A1* | 1/2007 | Langseth et al. | 707/100 |
| 2007/0011183 A1* | 1/2007 | Langseth et al. | 707/101 |

(Continued)

OTHER PUBLICATIONS

Gilbert, M.R. and T. Friedman, "The New Data Integration Frontier: Unifying Structured and Unstructured Data", ID No. G00138004, Mar. 31, 2006, 5 pp.

(Continued)

*Primary Examiner*—John R. Cottingham
*Assistant Examiner*—Nicholas E Allen
(74) *Attorney, Agent, or Firm*—Janaki K. Davda; Konrad Raynes & Victor LLP

(57) ABSTRACT

Provided are techniques for transforming unstructured information into content in a uniform context. The unstructured information and metadata associated with the unstructured information are extracted from one or more source content repositories. One or more custom transformations are performed on at least one of the unstructured information and the metadata. At least one of the transformed, unstructured information and the metadata are loaded into one or more target content repositories.

27 Claims, 7 Drawing Sheets

U.S. PATENT DOCUMENTS

2007/0050404 A1* 3/2007 Hunter et al. ........... 707/103 R

OTHER PUBLICATIONS

Kugel, R.D., "Unstructured Information Management", [online], 2005, [retrieved on Mar. 16, 2007], retrieved from the Internet at <URL: http://www.transformmag.com/showArticle.jhtml?articleID=16600014>, 5 pp.

Squire, C., "Data Extraction and Transformation for the Data Warehouse", ACM SIGMOD Record, vol. 24, Iss. 2, May 1995, pp. 446-447.

White, C., "Managing Data Transformations", [online], Dec. 1997, [retrieved on Mar. 16, 2007], retrieved from the Internet at <URL: http://www.byte.com/art/9712/sec4/art1.htm>, 6 pp.

Bull, L., P. Stanski, and D. M. Squire, "Content Extraction Signatures Using XML Digital Signatures and Custom Transforms On-Demand", Proceedings of the 12th international conference on World Wide Web, May 2003, pp. 170-177.

Fraternali, P., "Tools and Approaches for Developing Data-Intensive Web Applications: A Survey", ACM Computing Surveys, vol. 31, No. 3, Sep. 1999, pp. 227-263.

Vassiliadis, P., A. Simitsis, P. Georgantas, M. Terrovitis, and S. Skiadopoulos, "A Generic and Customizable Framework for the Design of ETL Scenarios", Information Systems 30, 2005, 492-525.

* cited by examiner

USE OF FEDERATION SERVICES AND TRANSFORMATION SERVICES TO PERFORM EXTRACT, TRANSFORM, AND LOAD (ETL) OF UNSTRUCTURED INFORMATION AND ASSOCIATED METADATA

BACKGROUND

1. Field

Embodiments of the invention relate to use of federation services and transformation services to perform extract, transform, and load (ETL) of unstructured information and associated metadata.

2. Description of the Related Art

Extraction, transformation and loading of structured data stored primarily in relational databases are described, for example, in the following references: (1) Squire, C., "Data Extraction and Transformation for the Data Warehouse", ACM Proceedings of Sigmod, Intl. Conference on Management of Data, Vol. 24, No. 1, Mar. 1, 1995, p. 446-447 ("Squire" hereinafter) and (2) White, C., "Managing Data Transformations", BYTE, Vol. 22, No. 12, Dec. 1, 1997, p. 53-54 ("White" hereinafter).

Structured information (also referred to as "structured data") may be described as including "alphanumeric values easily classified by specific attributes . . . [including values such as] . . . name, zip code, account balance, transaction number etc.", as described in Kugel, R., "Unstructured Information Management", Intelligent Enterprise, December 2003 ("Kugel" hereinafter). According to Kugel, structured information forms only 10-20% of enterprise information.

Unstructured information (also referred to as "unstructured data" or "native content" or "content") comprises the other 80-90% of all enterprise information. Unstructured information may be described as computerized information that does not have a structure that is easily readable by a computer. Unstructured information includes, for example, Binary Large OBjects (BLOBs) such as multimedia, emails, memos, white papers, etc. Today's complex business environment is subject to increasing regulation. Compliance requirements demand that corporations maintain documents and e-mails during seven years, in the case of an audit. While governance control becomes more stringent, the competitive playing field becomes more leveled. Companies are faced with greater competition, and, thus, need to make faster and better informed decisions in order to sustain growth. It is imperative that companies gain a unified view of their customer data in order to stay competitive, while improving productivity and reducing costs.

The unstructured information may be stored in a content repository. A content repository may be described as software, firmware, hardware, or any combination thereof, that manages the storage of the unstructured information.

Currently, there are techniques describing content management and federation such as the techniques described in U.S. Pat. No. 6,643,663, issued on Nov. 4, 2003, to Dabney et al.; U.S. Pat. No. 6,804,674, issued on Oct. 12, 2004, to Hsiao et al.; and U.S. Pat. No. 6,910,040, issued on Jun. 21, 2005 to Emmick et al. There are also techniques describing content transformation, such as U.S. Pat. No. 7,016,963, issued on Mar. 21, 2006, to Judd et al. In addition, there are techniques describing ETL for structured data residing in relational databases, such as U.S. Pat. No. 7,051,334, issued on May 23, 2006, to Porter et al.

Furthermore, enterprises gain from unifying structured and unstructured information. The time and effort to implement new applications that require combined data types should be minimized. Cost reduction over time can be significant if a common data integration infrastructure is deployed across the spectrum of data types according to Gilbert, Mark and Friedman, Ted, "The New Data Integration Frontier: Unifying Structured and Unstructured Data", Gartner, Mar. 31, 2006 ("Gilbert" hereinafter).

Thus, there is a need in the art for techniques that extract, transform and load unstructured information and associated metadata.

SUMMARY OF EMBODIMENTS OF THE INVENTION

Provided are a method, computer program product, and system for transforming unstructured information into content in a uniform context. The unstructured information and metadata associated with the unstructured information are extracted from one or more source content repositories. One or more custom transformations are performed on at least one of the unstructured information and the metadata. At least one of the transformed, unstructured information and the metadata are loaded into one or more target content repositories.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Certain embodiments use a federation service and a transformation service to perform Extract, Transform, Load (ETL) operations on unstructured information and associated metadata. The unstructured information may be binary data. The unstructured information may be referred to as "native content", "unstructured content" or "content". A federation service may be described as a service that allows applications to access and integrate diverse data (e.g., structured data) and content (e.g., unstructured information) as if they were a single resource, regardless of where the data and content reside. A transformation service may be described as a service that transforms (i.e., converts) data and/or content in one form to another form.

Figure 1:
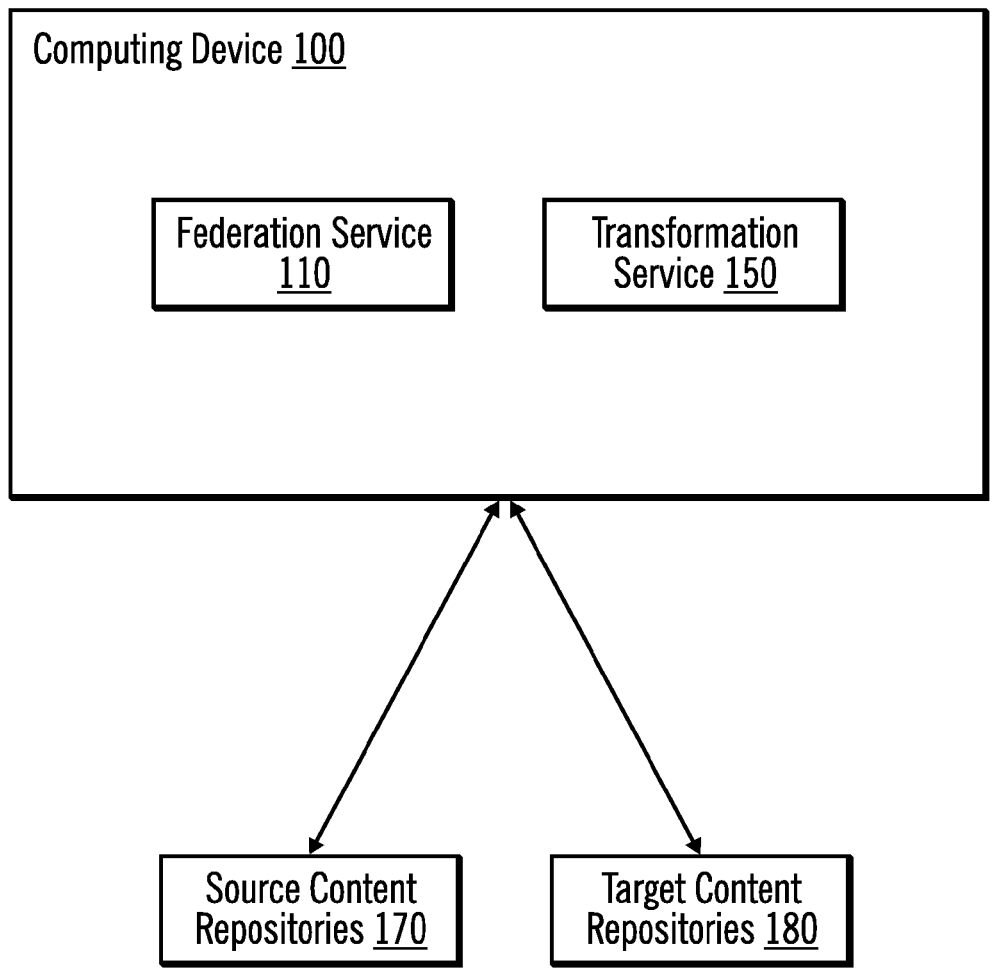
FIG. 1 illustrates a computing device and data stores in accordance with certain embodiments.

FIG. 1 illustrates a computing device 100 and data stores in accordance with certain embodiments. The computing device 100 includes a federation service 110 and a transformation service 150. In various embodiments, the federation service 110 and transformation service 150 may be executed at the same or different computing devices. Also, the functionality of the federation service 110 and/or transformation service 150 may be implemented across multiple computing devices.

The computing device 100 may be, for example, a server, mainframe, workstation, personal computer, hand held computer, laptop telephony device, network appliance, etc.

The computing device 100 is coupled to one or more source content repositories 170 and one or more target content repositories 180. The federation service 110 extracts unstructured information along with the metadata associated with it from one or more source content repositories 170. The transformation service 150 performs custom transformations on the content and/or associated metadata. Then, the federation service loads the transformed content and associated metadata into one or more target content repositories 180. In certain embodiments, the metadata is structured data.

Figure 2:
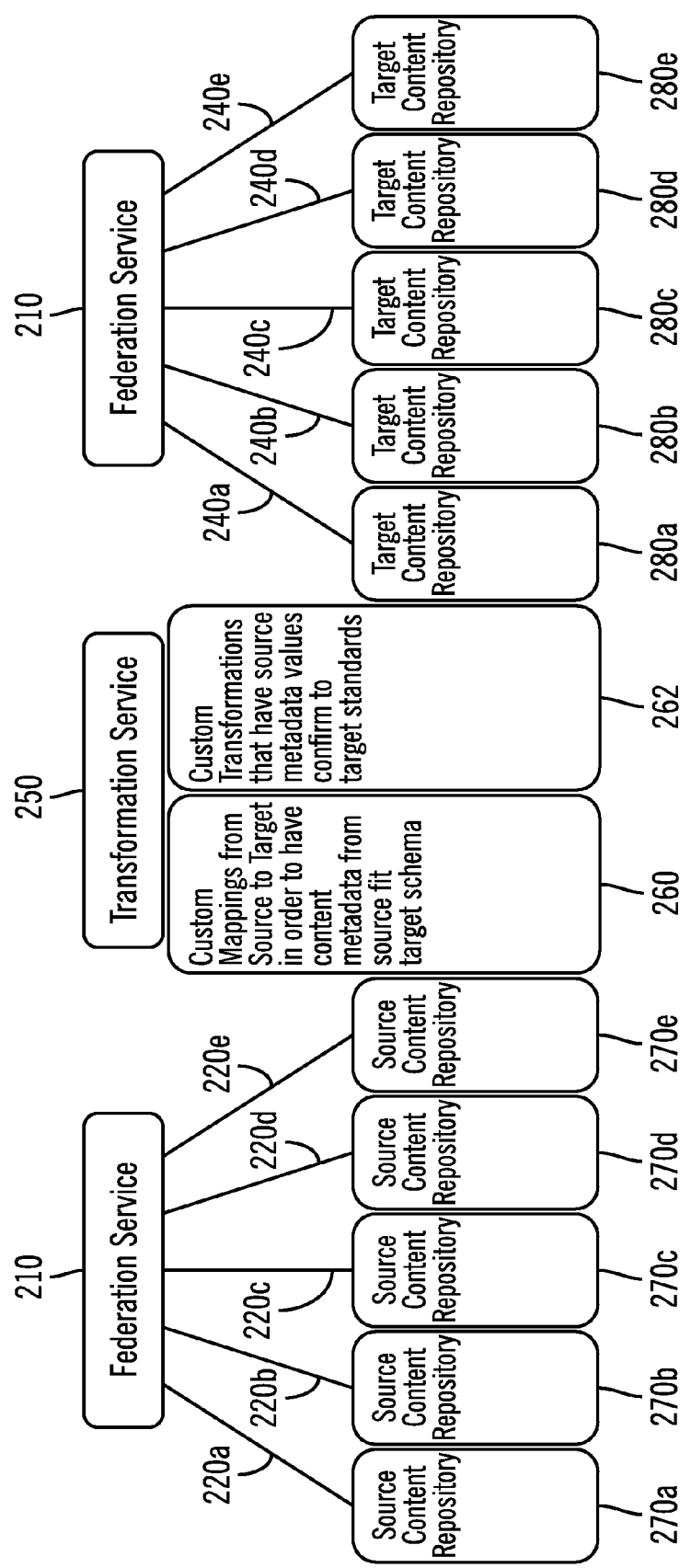
FIG. 2 illustrates details of a content architecture for ETL of unstructured information and associated metadata in accordance with certain embodiments.

FIG. 2 illustrates details of a content architecture for ETL of unstructured information and associated metadata in accordance with certain embodiments. Federation service 210 is an example implementation of federation service 110. Transformation service 250 is an example implementation of transformation service 150. Also, source content repositories 270a . . . 270e are example source content repositories 170, while target content repositories 280a . . . 280e are example target content repositories 180.

In FIG. 2, a federation service 210 extracts unstructured information (also referred as "native content") and associated metadata from source content repositories 270a . . . 270e and loads the native content and associated metadata into target content repositories 280a . . . 280e. The federation service 210 is coupled to the source content repositories 270a . . . 270e through communication paths 220a . . . 220e. The federation service 210 is coupled to the target content repositories 280a . . . 280e through communication paths 240a . . . 240e.

A transformation service 250 performs custom mappings 260 and custom transformations 262 between source and target schemas and metadata, respectively. The custom mappings 260 ensure that metadata for the source schemas fit the target schemas. The custom transformations 262 enable source metadata values conform to target standards.

The federation service 210 is set up on top of the content repositories 270a . . . 270e, 280a . . . 280e, including file systems, from which native content and associated metadata is to be extracted. A federation service may be described as a service that presents a single view of various content repositories to an end user. Each content repository 270a . . . 270e, 280a . . . 280e organizes content into one or more groups such that each group has its own metadata schema (also referred to as a "schema definition"). A group may be described as being analogous to a table in a database. A metadata schema describes the structure of the metadata associated with native content in a group.

Thus, embodiments are applicable to source content repositories that do not support organizing content into groups, such that each group has its own metadata schema. In a file system, for example, a single metadata schema may apply to an entire file system (repository).

Figure 3:
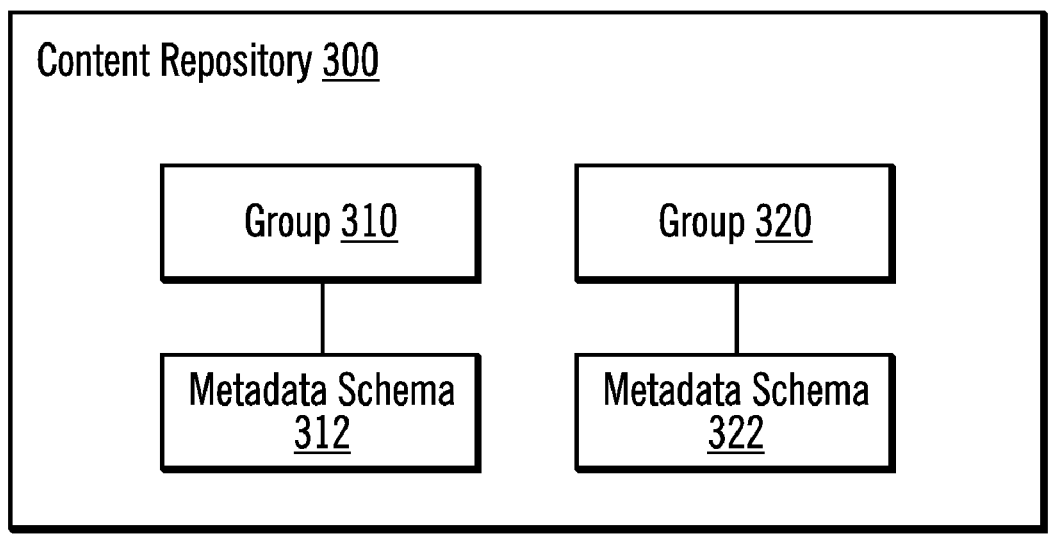
FIG. 3 illustrates a sample content repository in accordance with certain embodiments.

As an example, consider an insurance company having a content repository to store all the information related to insurance policies. One of the groups in the content repository may be "Auto Insurance Policy", and a metadata schema for the "Auto Insurance Policy" group may have the following form:
 Name: String
 Address: String
 Birthdate: Date
 Policy Number: Number
 Policy Date: Date
 Policy Premium: Number
 Make and Model of the Car: String
 Other family members insured:
  Name: String
  Birthdate: Date
  Name: String
  Birthdate: Date
   :
   :n times FIG. 3 illustrates a sample content repository 300 in accordance with certain embodiments. Content repository 300 includes group 310 and group 320. Group 310 has an associated metadata schema 312. Group 320 has an associated metadata schema 322.

With a query to the federation service, a user can then specify the item(s)/groups of items to be extracted. The following is a sample query:

Get all auto insurance policies whose policy date is later than Jan. 1, 1995

The user can also specify additional query constraints to narrow the scope of the search. After a query is generated, a schema definition file containing the metadata schemas of all the selected content groups is then sent to the transformation service 250.

Figure 4:
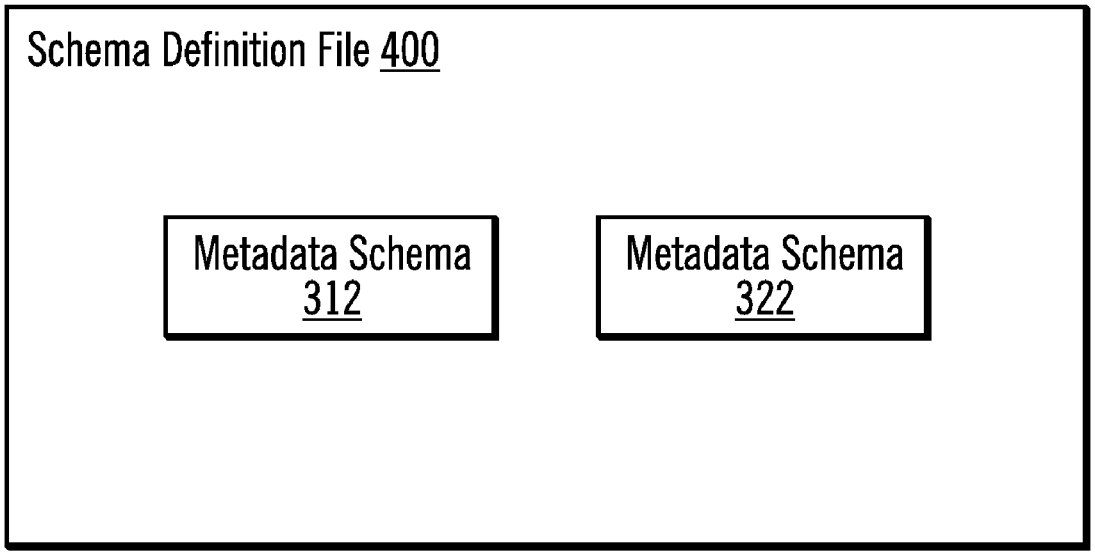
FIG. 4 illustrates a sample schema definition file in accordance with certain embodiments.

FIG. 4 illustrates a sample schema definition file 400 in accordance with certain embodiments. For example, for a query that selected groups 310 and 320 (FIG. 3), the schema definition file 400 would include metadata schema 312 and metadata schema 322.

Also, if the metadata schemas of the target content groups into which the content is to be loaded exist, these may be selected through the federation service 210 on the load end. If the metadata schemas of the target content groups into which the content is to be loaded do not exist, the user may specify that these be created from the source metadata schemas in the destination as new target metadata schemas. In either case, the metadata schemas of the target content groups are sent to the transformation service 250.

The transformation service 250 maps elements of the metadata schemas from source to target content groups. Also, for metadata values, the transformation service 250 provides custom transformations in order to cleanse the data or have the data conform to target standards. For example, in the source content group, a phone number field has the form "(xxx)xxx-xxxx", whereas, in the target content group, the phone number field has the form "xxx-xxx-xxxx". As another example that involves both mapping and transformations, in the source content group, the phone number field is called "Ph. no.", where as in the target content group, the phone number field is called "Phone number". In this example, the transformation service 150 uses the metadata schemas in the schema definition file to map these two fields and then transforms the format. Therefore, the transformation service 250, maps phone number fields using the metadata schemas and transforms the phone number field using the schema definitions.

Once the custom mappings and transformations are complete, native content is then extracted from the selected content groups, content metadata is transformed per the custom transformations, and the content is then loaded into the desired target content groups per the custom mappings.

The communication paths 220a . . . 220e, 240a . . . 240e may comprise any type of network, such as, for example, a peer-to-peer network, spoke and hub network, Storage Area Network (SAN), a Local Area Network (LAN), Wide Area Network (WAN), the Internet, an Intranet, etc. Although a number of communication paths 220a ... 220e, 240a ... 240e are illustrated, in various embodiments, different content repositories 270a ... 270e and 280a ... 280e may be coupled to the federation service 210 by sharing communication paths.

Each of the source and target content repositories 270a ... 270e, 280a ... 280e may comprise an array of storage devices, such as Direct Access Storage Devices (DASDs), Just a Bunch of Disks (JBOD), Redundant Array of Independent Disks (RAID), virtualization device, etc.

Figure 5A:
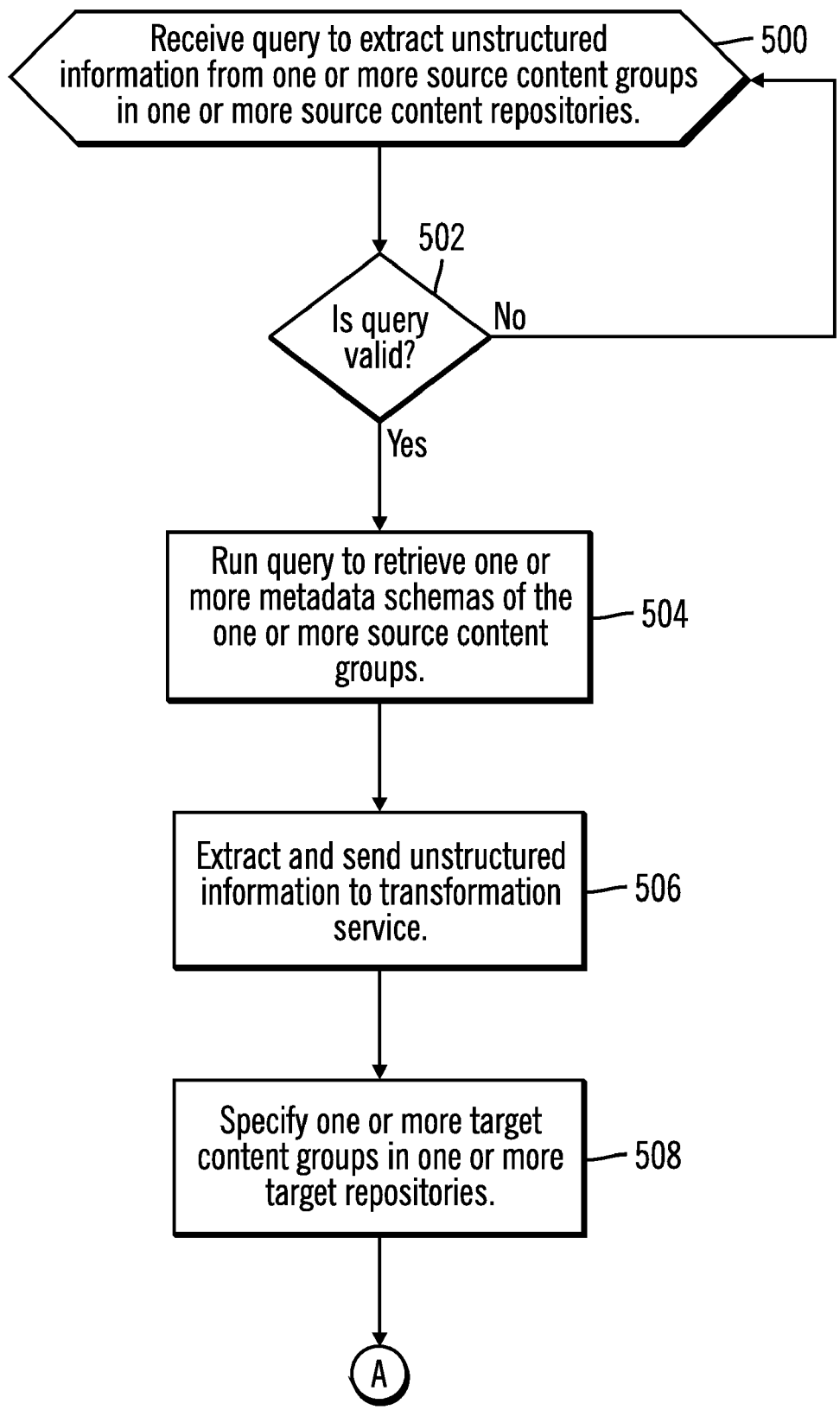
FIGS. 5A and 5B illustrate logic implemented by a federation service and a transformation service in accordance with certain embodiments.
Figure 5B:
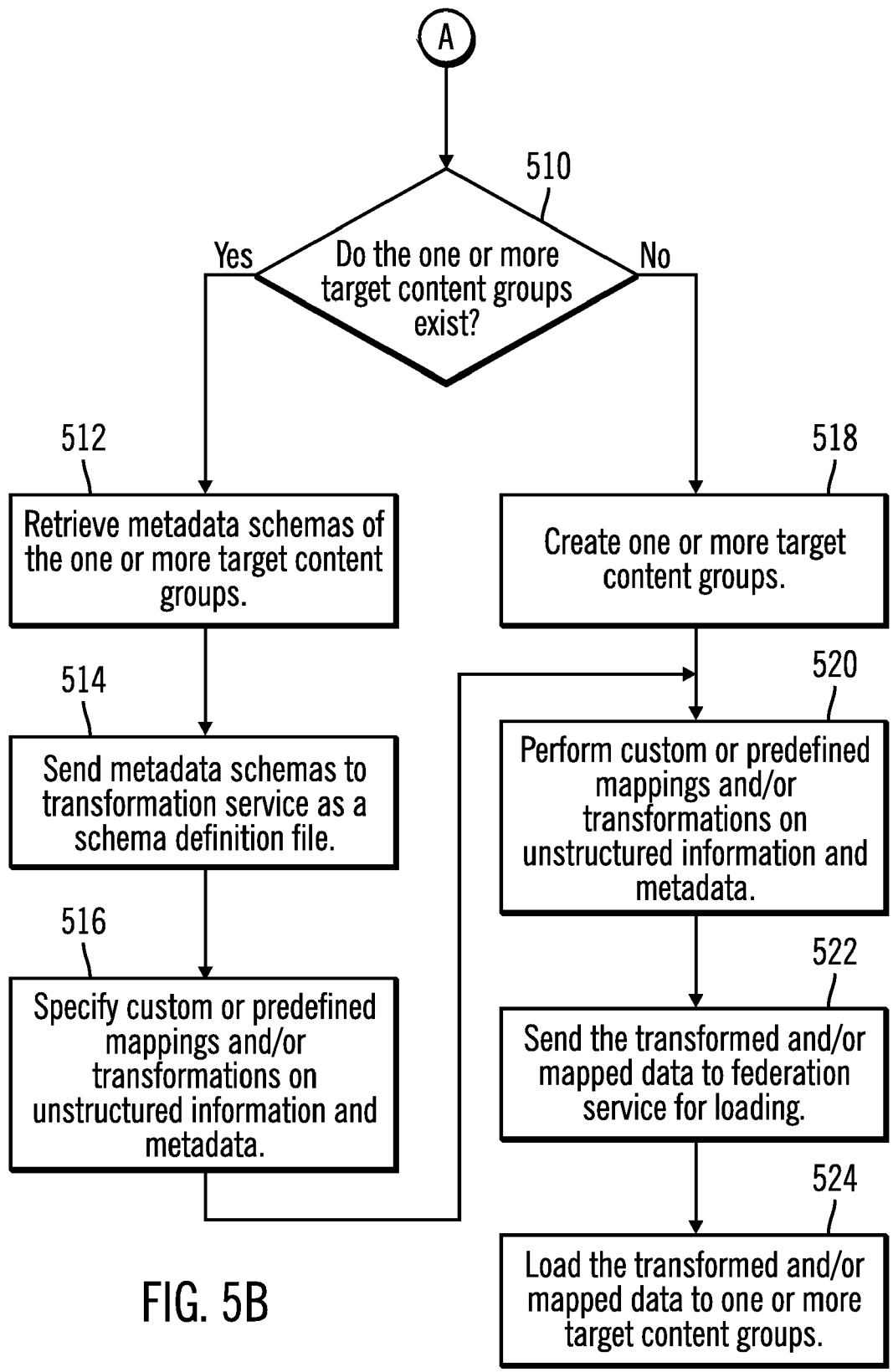

FIGS. 5A and 5B illustrate logic implemented by the federation service 210 and the transformation service 250 in accordance with certain embodiments. Control begins at block 500 in FIG. 5A with the federation service 110 receiving a query to extract native content from one or more source content groups in one or more source content repositories 170. In block 502, the federation service 110 determines whether the query is valid. If the query is valid, processing continues to block 504, otherwise, processing returns to block 500, and the federation service 110 waits to receive another query. Although not shown, if a query is not valid, certain error processing may be performed (e.g., sending a message to an end user).

In block 504, the federation service 110 runs the query to retrieve one or more metadata schemas of the one or more source content groups. Retrieving the metadata schemas includes identifying them. In block 506, the federation service 110 extracts and sends native content to the transformation service 150.

In block 508, one or more target content groups in one or more target repositories 180 are specified by a user. From block 508, processing continues to block 510 (FIG. 5B). In block 510, the federation service 110 determines whether the one or more target content groups exist. If so, processing continues to block 512, otherwise, processing continues to block 518.

In block 512, the federation service 110 retrieves metadata schemas of the one or more target content groups. Retrieving the metadata schemas includes identifying them. In block 514, the federation service 110 sends the metadata schemas for the source and target content groups to the transformation service 150 as a schema definition file. That is, the federation service 110 creates the schema definition file using the retrieved metadata schemas for the source and target content groups. In block 516, custom or predefined mappings and transformations on native content and/or metadata are specified by a user. The custom or predefined mappings and transformations may be specified, for example, via a user interface or a file. From block 516, processing continues to block 520. In block 520, the transformation service 150 performs custom or predefined mappings and transformations on native content and/or metadata. Then, the transformation service 150 sends the transformed and/or mapped data to the federation service 110 for loading. In block 524, the federation service 110 loads the transformed and/or mapped data to one or more target content groups. This includes extracting native content from the one or more source content groups and loading the content into the one or more target content groups per the custom mappings and transformations.

In block 510, if the target content groups do not exist, processing continues to block 518. In block 518, the federation service 110 creates one or more target content groups. From block 518, processing continues to block 520.

Certain embodiments define a general framework for transforming unstructured content in one or more different formats into content in a uniform context using federation services and transformation services (that apply custom or predefined mappings and transformation on native content and metadata). For example, a text document format may be converted to a Portable Document Format (PDF) format.

Thus, embodiments perform the ETL process for unstructured information and associated metadata using a federation service 210 to extract content from source content repositories 270a ... 270e and load the content to target content repositories 280a ... 280e. Also, a transformation service 250 maps the content from source to target content repositories 270a ... 270e, 280a ... 280e (so as to have the native content metadata conform to the target schema) and also to perform custom transformations to the actual metadata values.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 5A and 5B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 5A and 5B may be implemented in software, hardware, programmable and non-programmable gate array logic or in some combination of hardware, software, or gate array logic.

Figure 6:
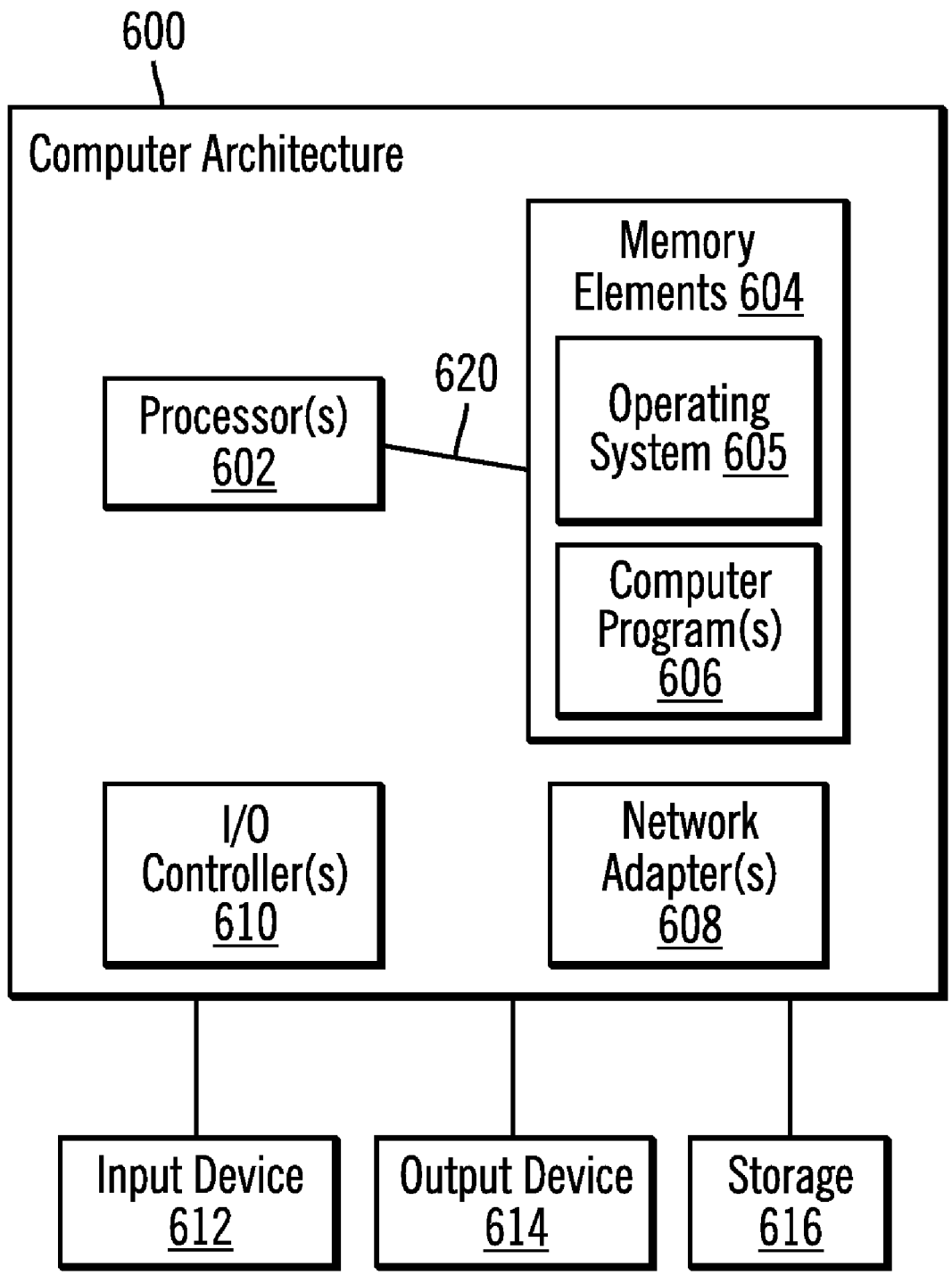
FIG. 6 illustrates a system architecture that may be used in accordance with certain embodiments.

FIG. 6 illustrates a system architecture 600 that may be used in accordance with certain embodiments. Computing device 100 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for transforming unstructured information into content in a uniform context, comprising:
   with a federation service of a computer including a processor that presents a single view of source content repositories to a user:
      receiving a query specifying source content groups stored in a set of the source content repositories;
      running the query to retrieve metadata schemas of the source content groups, wherein each source content group has a metadata schema that describes a structure of metadata associated with the unstructured information in the source content group;
      extracting the unstructured information and metadata associated with the unstructured information from the set of the source content repositories;
      in response to user input, receiving selection of target content groups in another set of target content repositories;
      in response to receiving the selection of the target content groups, identifying metadata schemas of the target content groups, wherein each metadata schema describes a structure of metadata associated with the unstructured information in the target content group;
      creating a schema definition file including the retrieved metadata schemas of the source content groups and the identified metadata schemas of the target content groups;
      forwarding the unstructured information, metadata, and schema definition file to a transformation service of the computer;
      receiving, from the transformation service, transformed unstructured information and transformed metadata; and
      loading the transformed, unstructured information and the transformed metadata into the set of the target content repositories.

2. The computer-implemented method of claim 1, wherein the unstructured information is in a plurality of different formats.

3. The computer-implemented method of claim 1, further comprising:
   using a transformation service to perform custom mappings to map the retrieved metadata schemas of the source content groups to metadata schemas of the target content groups and to perform custom transformations on at least one of the unstructured information and the metadata.

4. The computer-implemented method of claim 1, further comprising:
using the custom mappings to map elements of the metadata schemas for the source content groups and the target content groups.

5. The computer-implemented method of claim 1, further comprising:
extracting the unstructured information from the source content groups in the set of the source content repositories; and
loading the unstructured information into the target content groups in the set of the target content repositories.

6. The computer-implemented method of claim 1, further comprising:
in response to determining that the target content groups do not exist, creating the target content groups in the set of the target content repositories using the metadata schemas for the source content groups in the set of the source content repositories.

7. The computer-implemented method of claim 1, further comprising:
in response to determining that the metadata schemas of the target content groups into which content is to be loaded do not exist, creating the metadata schemas of the target content groups using the metadata schemas of the source content groups in the set of the source content repositories.

8. A computer program product comprising a computer readable storage medium including a computer readable program, wherein the computer readable program when executed by a processor on a computer causes the computer to:
with a federation service of the computer that presents a single view of source content repositories to a user:
receive a query specifying source content groups stored in a set of the source content repositories;
run the query to retrieve metadata schemas of the source content groups, wherein each source content group has a metadata schema that describes a structure of metadata associated with the unstructured information in the source content group;
extract the unstructured information and metadata associated with the unstructured information from the set of the source content repositories;
in response to user input, receive selection of target content groups in another set of target content repositories;
in response to receiving the selection of the target content groups, identify metadata schemas of the target content groups, wherein each metadata schema describes a structure of metadata associated with the unstructured information in the target content group;
create a schema definition file including the retrieved metadata schemas of the source content groups and the identified metadata schemas of the target content groups;
forward the unstructured information, metadata, and schema definition file to a transformation service of the computer;
receive, from the transformation service, transformed unstructured information and transformed metadata; and
load the transformed, unstructured information and the metadata into the set of the target content repositories.

9. The computer program product of claim 8, wherein the unstructured information is in a plurality of different formats.

10. The computer program product of claim 8, wherein the computer readable program when executed on a computer causes the computer to:
use a transformation service to perform custom mappings to map the retrieved metadata schemas of the source content groups to metadata schemas of the target content groups and to perform custom transformations on at least one of the unstructured information and the metadata.

11. The computer program product of claim 1, wherein the computer readable program when executed on a computer causes the computer to:
use the custom mappings to map elements of the metadata schemas for the source content groups and the target content groups.

12. The computer program product of claim 8, wherein the computer readable program when executed on a computer causes the computer to:
extract the unstructured information from the source content groups in the set of the source content repositories; and
load the unstructured information into the target content groups in the set of the target content repositories.

13. The computer program product of claim 8, wherein the computer readable program when executed on a computer causes the computer to:
in response to determining that the target content groups do not exist, create the target content groups in the set of the target content repositories using the metadata schemas for the source content groups in the set of the source content repositories.

14. The computer program product of claim 8, wherein the computer readable program when executed on a computer causes the computer to:
in response to determining that the metadata schemas of the target content groups into which content is to be loaded do not exist, create the metadata schemas of the target content groups using the metadata schemas of the source content groups in the set of the source content repositories.

15. A system for transforming unstructured information into content in a uniform context, comprising:
hardware logic implemented in a computer to perform operations, the operations comprising:
with a federation service of the computer that presents a single view of source content repositories to a user:
receiving a query specifying source content groups stored in a set of the source content repositories;
running the query to retrieve metadata schemas of the source content groups, wherein each source content group has a metadata schema that describes a structure of metadata associated with the unstructured information in the source content group;
extracting the unstructured information and metadata associated with the unstructured information from the set of the source content repositories;
in response to user input, receiving selection of target content groups in another set of target content repositories;
in response to receiving the selection of the target content groups, identifying metadata schemas of the target content groups, wherein each metadata schema describes a structure of metadata associated with the unstructured information in the target content group;

creating a schema definition file including the retrieved metadata schemas of the source content groups and the identified metadata schemas of the target content groups;

forwarding the unstructured information, metadata, and schema definition file to a transformation service of the computer;

receiving, from the transformation service, transformed unstructured information and transformed metadata; and loading the transformed, unstructured information and the metadata into the set of the target content repositories.

16. The system of claim 15, wherein the unstructured information is in a plurality of different formats.

17. The system of claim 15, wherein the operations further comprise:

using a transformation service to perform custom mappings to map the retrieved metadata schemas of the source content groups to metadata schemas of the target content groups and to perform custom transformations on at least one of the unstructured information and the metadata.

18. The system of claim 15, wherein the operations further comprise:

using the custom mappings to map elements of the metadata schemas for the source content groups and the target content groups.

19. The system of claim 15, wherein the operations further comprise:

extracting the unstructured information from the source content groups in the set of the source content repositories; and loading the unstructured information into the target content groups in the set of the target content repositories.

20. The system of claim 15, wherein the operations further comprise:

in response to determining that the target content groups do not exist, creating the target content groups in the set of the target content repositories using the metadata schemas for the source content groups in the set of the source content repositories.

21. The system of claim 15, wherein the operations further comprise:

in response to determining that the metadata schemas of the target content groups into which content is to be loaded do not exist, creating the metadata schemas of the target content groups using the metadata schemas of the source content groups in the set of the source content repositories.

22. A computer-implemented method for transforming unstructured information and associated metadata into content in a uniform context, comprising:

using a federation service of a computer including a processor that presents a single view of source content repositories to a user:

receiving a query specifying source content groups in a set of the source content repositories;

running the query to retrieve metadata schemas of the source content groups specified in the query, wherein each source content group has a metadata schema that describes a structure of metadata associated with the unstructured information in the source content group;

extracting the unstructured information and metadata associated with the unstructured information from the set of the source content repositories;

in response to user input, receiving selection of target content groups in another set of target content repositories;

in response to receiving the selection of the target content groups, identifying metadata schemas of the target content groups, wherein each metadata schema describes a structure of metadata associated with the unstructured information in a target content group;

creating a schema definition file including the extracted metadata schemas of the source content groups and the identified metadata schemas of the target content groups;

forwarding the unstructured information, metadata, and schema definition file to a transformation service of the computer;

using the transformation service, performing one or more custom mappings on at least one of the unstructured information and the associated metadata by mapping elements of the extracted metadata schemas of the source content groups to the identified metadata schemas of the target content groups;

transforming at least one of the unstructured information and the associated metadata with custom transformations; and forwarding the mapped and transformed unstructured information and the associated metadata to the federation service.

23. The computer-implemented method of claim 22, further comprising:

using the federation service:

receiving, from the transformation service, mapped and transformed unstructured information and the associated metadata; and loading the mapped and transformed unstructured information and the associated metadata into the target content groups.

24. A computer program product comprising a computer readable storage medium storing a computer readable program, wherein the computer readable program when executed by a processor on a computer causes the computer to:

using a federation service of the computer that presents a single view of source content repositories to a user:

receive a query specifying source content groups in a set of the source content repositories;

run the query to retrieve metadata schemas of the source content groups specified in the query, wherein each source content group has a metadata schema that describes a structure of metadata associated with the unstructured information in the source content group;

extract the unstructured information and metadata associated with the unstructured information from the set of the source content repositories;

in response to user input, receive selection of target content groups in another set of target content repositories;

in response to receiving the selection of the target content groups, identify metadata schemas of the target content groups, wherein each metadata schema describes a structure of metadata associated with the unstructured information in a target content group;

creating a schema definition file including the extracted metadata schemas of the source content groups and the identified metadata schemas of the target content groups;

forwarding the unstructured information, metadata, and schema definition file to a transformation service of the computer; and using the transformation service, perform one or more custom mappings on at least one of the unstructured information and the associated metadata by mapping elements of the extracted metadata schemas of the source content groups to the identified metadata schemas of the target content groups;

transform at least one of the unstructured information and the associated metadata with custom transformations; and forward the mapped and transformed unstructured information and the associated metadata to the federation service.

25. The computer program product of claim 24, wherein the computer readable program when executed on a computer causes the computer to:

using the federation service:

receive, from the transformation service, mapped and transformed unstructured information and the associated metadata; and load the mapped and transformed unstructured information and the associated metadata into the target content groups.

26. A system for transforming unstructured information and associated metadata into content in a uniform context, comprising:

hardware logic implemented in a computer to perform operations, the operations comprising:

using a federation service of the computer that presents a single view of source content repositories to a user:

receiving a query specifying source content groups in a set of the source content repositories;

running the query to retrieve metadata schemas of the source content groups specified in the query, wherein each source content group has a metadata schema that describes structure of metadata associated with the unstructured information in the source content group;

extracting the unstructured information and metadata associated with the unstructured information from the set of the source content repositories;

in response to user input, receiving selection of target content groups in another set of target content repositories;

in response to receiving the selection of the target content groups, identifying metadata schemas of the target content groups, wherein each metadata schema describes a structure of metadata associated with the unstructured information in a target content group;

creating a schema definition file including the extracted metadata schemas of the source content groups and the identified metadata schemas of the target content groups;

forwarding the unstructured information, metadata, and schema definition file to a transformation service of the computer; and using the transformation service, performing one or more custom mappings on at least one of the unstructured information and the associated metadata by mapping elements of the extracted metadata schemas of the source content groups to the identified metadata schemas of the target content groups;

transforming at least one of the unstructured information and the associated metadata with custom transformations; and forwarding the mapped and transformed unstructured information and the associated metadata to the federation service.

27. The system of claim 26, wherein the operations further comprise:

using the federation service:

receiving, from the transformation service, mapped and transformed unstructured information and the associated metadata; and loading the mapped and transformed unstructured information and the associated metadata into the target content groups.

* * * * *